(12) United States Patent
Riedmueller et al.

(10) Patent No.: US 9,217,652 B2
(45) Date of Patent: *Dec. 22, 2015

(54) SENSOR ARRANGEMENT AND METHOD FOR OPERATING A SENSOR ARRANGEMENT

(75) Inventors: Kurt Riedmueller, Unterpremstaetten (AT); Thomas Oswald, Stainztal (AT)

(73) Assignee: AMS AG, Unterpremstaetten (AT)

( * ) Notice: Subject to any disclaimer, the term of this patent is extended or adjusted under 35 U.S.C. 154(b) by 251 days.

This patent is subject to a terminal disclaimer.

(21) Appl. No.: 13/101,995

(22) Filed: May 5, 2011

(65) Prior Publication Data
US 2011/0273173 A1   Nov. 10, 2011

(30) Foreign Application Priority Data

May 5, 2010   (DE) .................. 10 2010 019 485

(51) Int. Cl.
*G01D 5/14* (2006.01)
*G01D 18/00* (2006.01)

(52) U.S. Cl.
CPC .............. *G01D 5/145* (2013.01); *G01D 18/008* (2013.01)

(58) Field of Classification Search
CPC . G01D 5/145; G01D 5/2448; G01D 5/24452; G01D 18/00–18/008; G01R 33/0017; G01R 33/0094; G01R 35/00; G01R 33/0023–33/0041
USPC .......... 324/202, 207.12, 207.24, 207.25, 244, 324/251, 252; 702/85–107
See application file for complete search history.

(56) References Cited

U.S. PATENT DOCUMENTS

| 4,818,939 | A | * | 4/1989 | Takahashi et al. | ........ 324/207.21 |
| 4,953,305 | A | * | 9/1990 | Van Lente et al. | .............. 33/356 |
| 5,299,143 | A | * | 3/1994 | Hellinga et al. | .............. 702/158 |
| 6,173,501 | B1 | * | 1/2001 | Blank et al. | ..................... 33/356 |
| 6,424,143 | B1 | | 7/2002 | Blossfeld et al. | |
| 6,462,683 | B2 | | 10/2002 | Draxelmayr | |
| 6,501,261 | B2 | * | 12/2002 | Muth | ........................... 324/166 |
| 6,522,130 | B1 | | 2/2003 | Lutz | |

(Continued)

FOREIGN PATENT DOCUMENTS

| EP | 1 830 162 | 12/2005 | | |
| JP | 06186103 A | * | 7/1994 | ................ G01L 9/00 |
| WO | WO 2009/052537 | 4/2009 | | |

OTHER PUBLICATIONS

"A1373/A1374—High Precision, Output Pin Programmable Linear Hall Effect Sensors ICs", Allegro MicroSystems, Inc., Massachusetts, USA, Rev. 11, pp. 1-22, 2008.

(Continued)

*Primary Examiner* — Huy Q Phan
*Assistant Examiner* — James Split
(74) *Attorney, Agent, or Firm* — McDermott Will & Emery LLP

(57) ABSTRACT

A sensor arrangement comprises at least one magnetic-field sensor (SM1). A signal-processing unit (PROC) is set up to determine a minimum signal (MIN) and a maximum signal (MAX) of the magnetic-field sensor (SM1) over the full scale range (FSR) of the sensor arrangement. An adjustment circuit (DSPL) is set up to generate a correction signal (COR) as a function of the minimum and maximum signals (MIN, MAX). A first combination means (ADD1) couples the first magnetic-field sensor (SM1) on the input side to the adjustment circuit (DSPL) and connects the magnetic-field sensor (SM1) on the output side to a signal output (OUT).

6 Claims, 12 Drawing Sheets

(56) References Cited

U.S. PATENT DOCUMENTS

| | | | |
|---|---|---|---|
| 6,686,733 B2 | 2/2004 | Muth | |
| 7,046,000 B1 * | 5/2006 | Hara et al. | 324/207.25 |
| 7,231,325 B2 | 6/2007 | Motz et al. | |
| 7,295,941 B2 * | 11/2007 | Maier et al. | 702/85 |
| 7,355,389 B2 * | 4/2008 | Rieger et al. | 324/207.24 |
| 7,606,676 B2 * | 10/2009 | Sato et al. | 702/85 |
| 7,746,065 B2 * | 6/2010 | Pastre et al. | 324/202 |
| 8,183,856 B2 * | 5/2012 | Hainz et al. | 324/207.2 |
| 2002/0190709 A1 | 12/2002 | Frederick et al. | |
| 2009/0001965 A1 | 1/2009 | Ausserlechner et al. | |
| 2009/0206829 A1 * | 8/2009 | Kamiya et al. | 324/207.25 |
| 2009/0212771 A1 * | 8/2009 | Cummings et al. | 324/252 |
| 2009/0295373 A1 * | 12/2009 | Motz | 324/202 |
| 2012/0086442 A1 * | 4/2012 | Haas et al. | 324/225 |
| 2013/0002242 A1 * | 1/2013 | Tsukamoto et al. | 324/207.12 |

OTHER PUBLICATIONS

"AS8372—Double Linear Hall Sensor", austriamicrosystems AG, Austria, Preliminary Data Sheet, Revision No. 1, Sep. 11, 2001, pp. 1-11.

G. Pepka, "Position and Level Sensing Using Hall Effect Sensing Technology", Allegro MicroSystems, Inc., Massachusetts, USA, AN295044, Rev. 1, pp. 1-7, 2007.

"Sensor Solution", Asahi Kasei EMD Corp., Apr. 1, 2009, 4 pages, Tokyo, Japan.

* cited by examiner

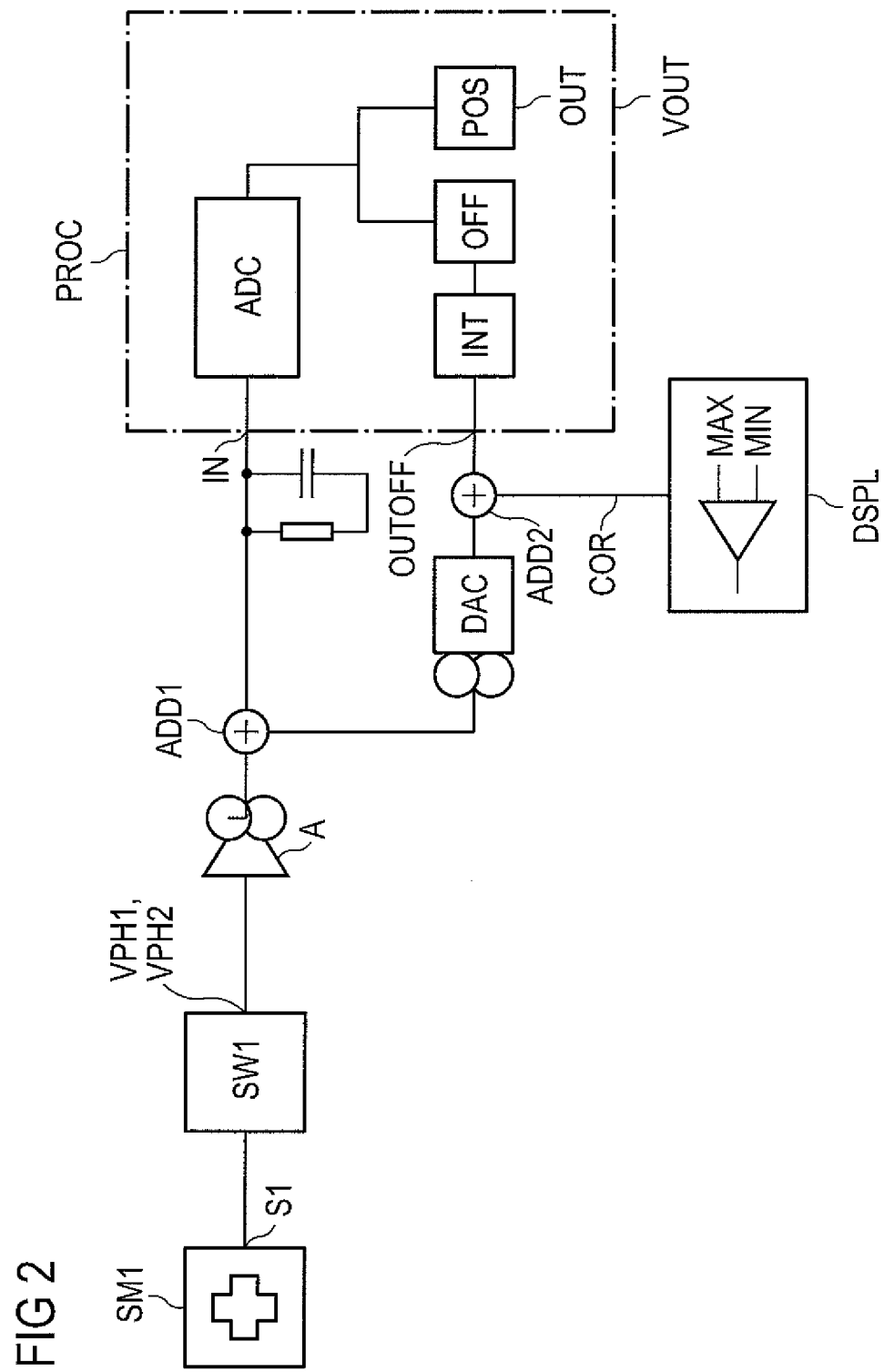

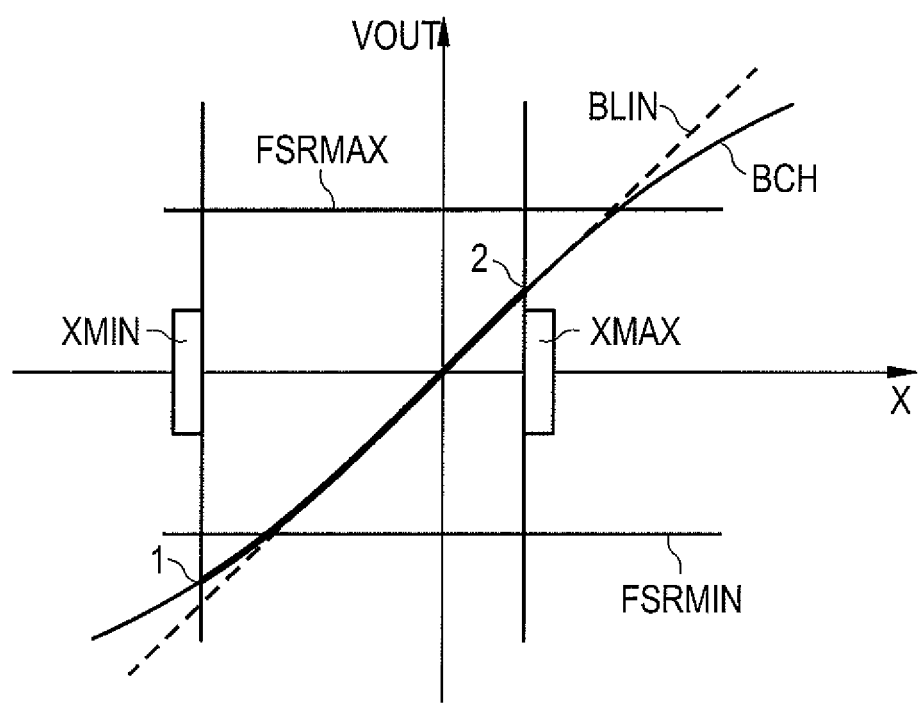

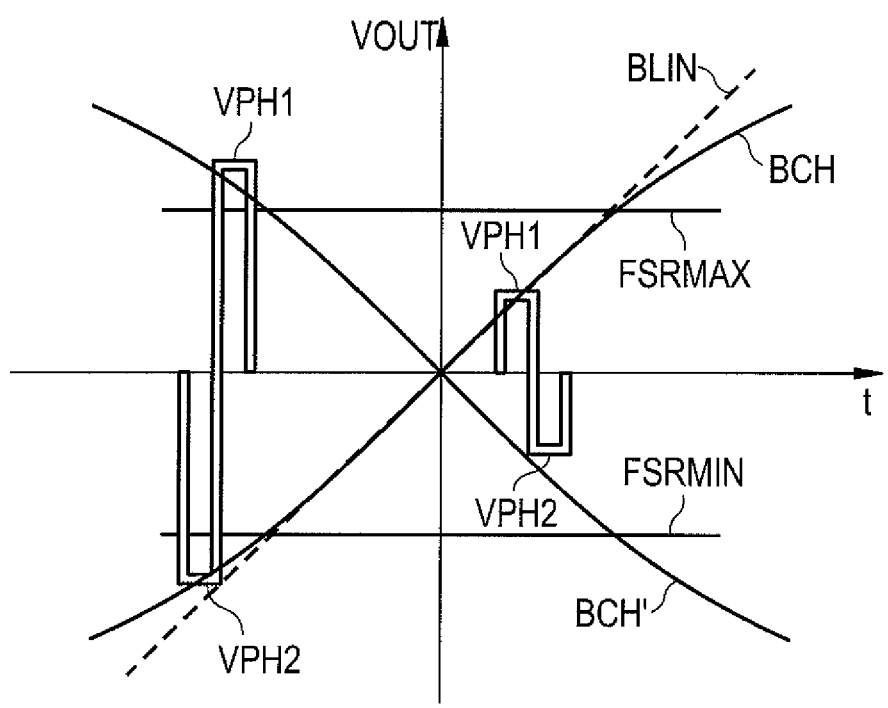

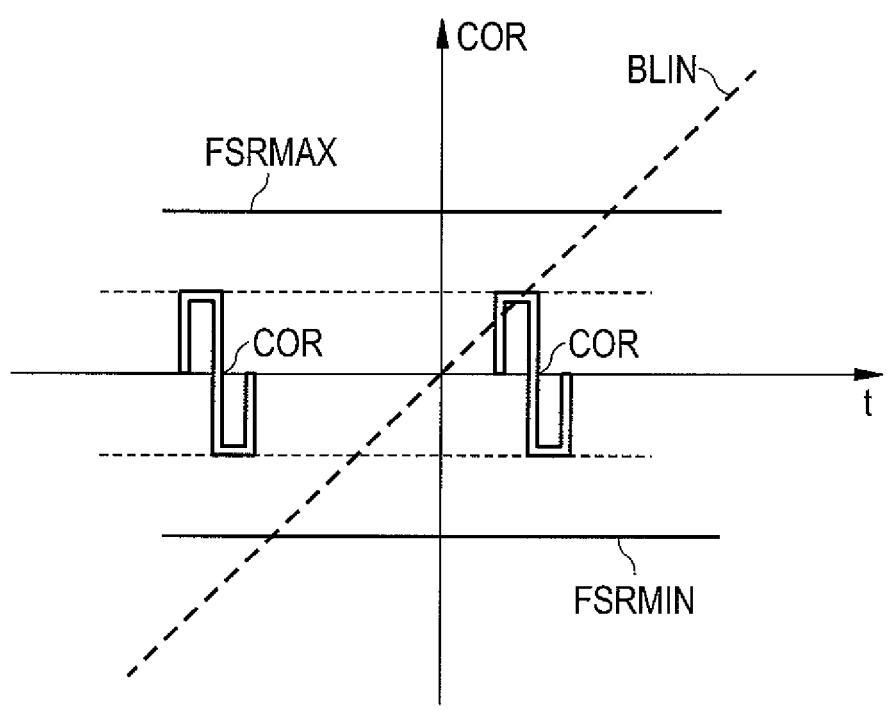

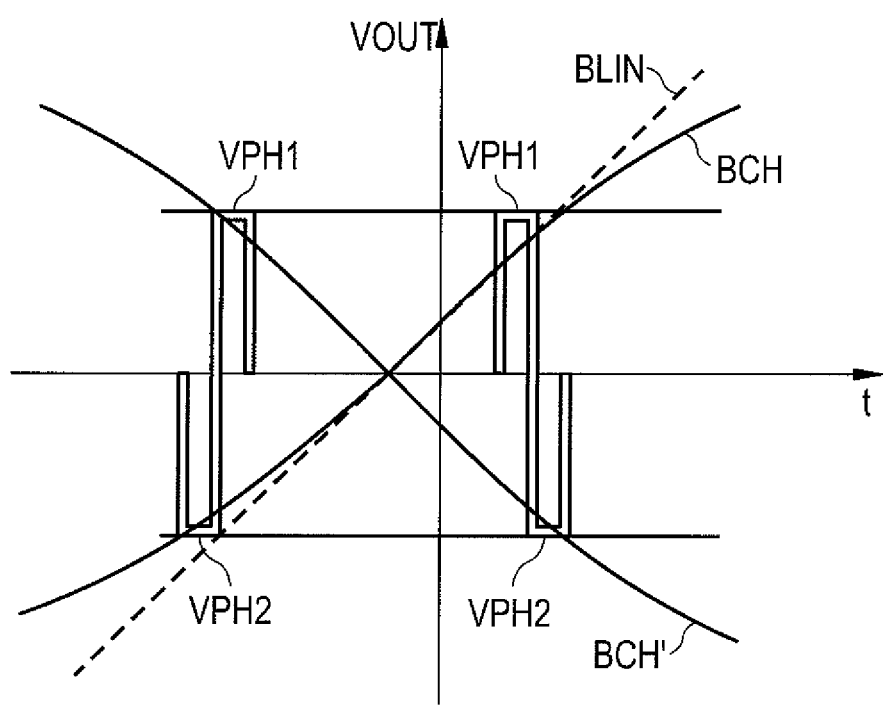

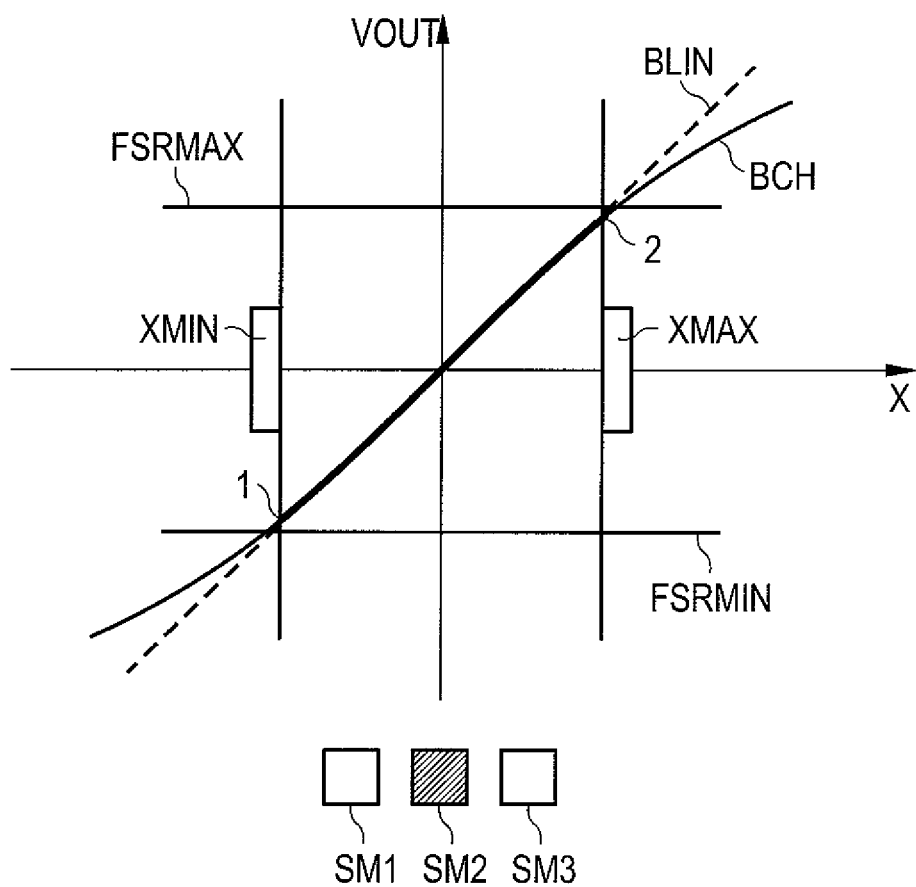

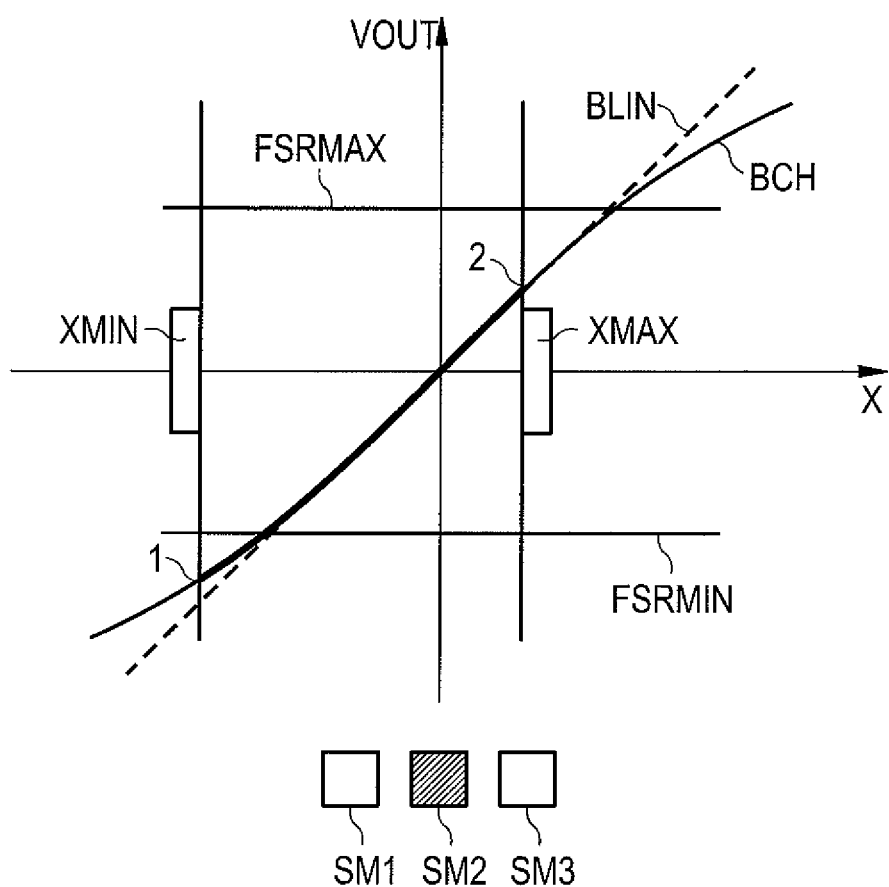

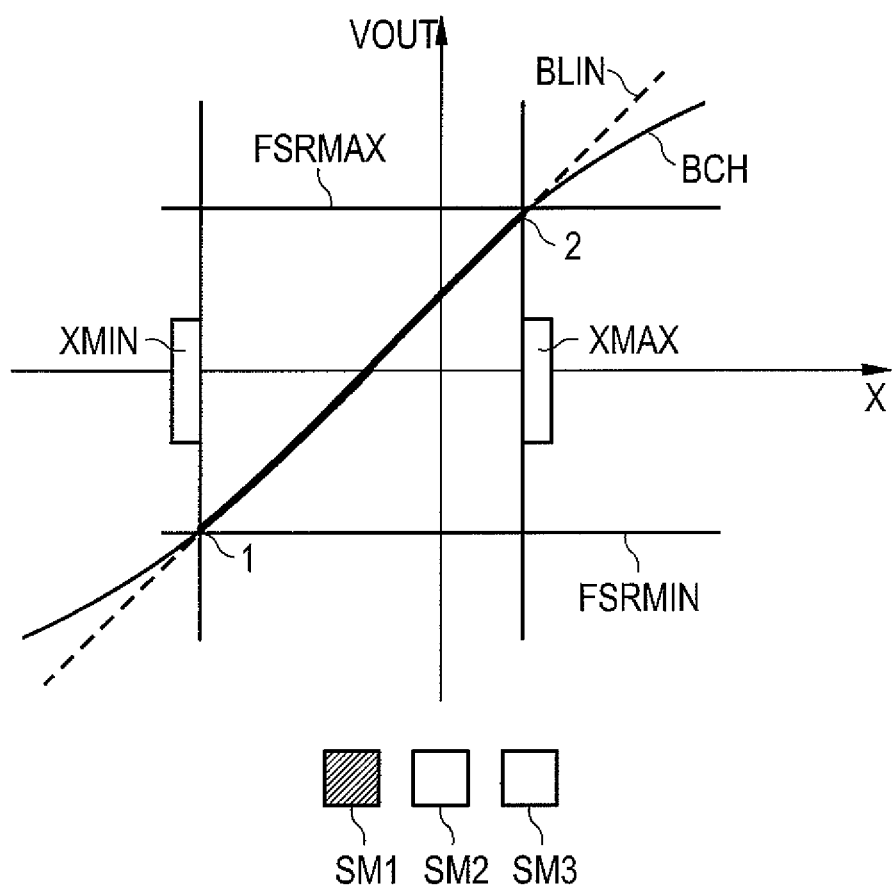

SENSOR ARRANGEMENT AND METHOD FOR OPERATING A SENSOR ARRANGEMENT

RELATED APPLICATIONS

This application claims the priority of German patent application no. 10 2010 019 485.9, the content of which is hereby incorporated by reference.

FIELD OF THE INVENTION

The invention relates to a sensor arrangement and a method for operating a sensor arrangement.

BACKGROUND OF THE INVENTION

Non-contact and economical position determinations are made possible by a combination of a commercially available magnet or magnetic strip with a magnetic-field sensor (typically a Hall element). If the magnetic-field source is rotatably seated relative to the sensor, then such an arrangement enables a non-contact angle determination. On the other hand, if the magnetic-field source is movable linearly along a movement axis, then a one-dimensional position determination is possible. There is a fundamental difference in this context between unipolar and bipolar arrangements, depending on whether a single magnetic pole or several magnetic poles are used for measurement.

FIG. 1A shows a bipolar arrangement of a magnetic-field source N, S and a magnetic-field sensor SM1. The magnetic-field source N, S is, for example, a bar magnet and is movable relative to the magnetic-field sensor SM1 along a movement axis X. The magnetic-field sensor SM1 is ordinarily a Hall element. A characteristic measurement curve for the described arrangement is shown in FIG. 1A. The graphic shows the magnetic-field strength B (measured in mT) plotted against positions (measured in mm) along the movement axis X. The resulting magnetic-field function BX has several characteristic points. The minimum of the magnetic field BMIN corresponds to the minimum of the magnetic-field function BX and the maximum of the magnetic field BMAX corresponds to the maximum of the magnetic-field function BX. These points correspond in a certain sense to the individual poles of the magnetic-field source N, S. The magnetic-field function BX runs nearly linearly and through the magnetic origin B0 between the minimum and the maximum BMIN, BMAX of the magnetic field. The magnetic-field origin B0 is characterized by the fact that the magnetic-field function BX is ideally zero there. The magnetic-field origin B0 further characterizes the case in which the magnetic-field source N, S is centered above the magnetic-field sensor SM1 along the movement axis X. In practice, the measured value of the magnetic-field function BX at this point is not equal to zero, but is instead influenced by secondary effects such as temperature and production tolerances of the magnetic-field sensor SM1, as well as the distance between the magnetic-field sensor SM1 and the magnetic-field source N, S (the so-called air gap). Due to these effects, the signal from the magnetic-field sensor SM1 is generally not equal to zero.

The central parameter for applications of the bipolar and unipolar sensor arrangements for angle and position determination is the resolution (for a given air gap). The resolution is in turn dependent on a gain G of the sensor arrangement, which is determined by the output voltage VOUT of the magnetic-field sensor SM1 and by the magnetic-field strength B:

$$G = \frac{VOUT}{B}.$$

For an optimal gain G and thus an optimal resolution, it is particularly important to remain in the linear range of the magnetic-field function BX over a movement range XMIN, XMAX of the magnetic-field source N, S. For this it is necessary to know a minimum endpoint XMIN of the movement of the magnetic-field source N, S and a maximum endpoint XMAX. By suitable selection of the movement range XMIN, XMAX, the full scale range FSR of the sensor arrangement between an upper and a lower full scale range limit FSRMIN, FSRMAX of the magnetic-field sensor SM1 can be filled. The lower and upper full scale range limits FSRMIN, FSRMAX are generally dependent on the magnetic-field sensor SM1 in use, as well as on the components for signal processing that are used. The terms full scale range or full scale range limits of the sensor arrangement, or simply full scale range and full scale range limits, are used below in this sense.

FIG. 1B shows a characteristic magnetic field curve BCH, which is derived from the output voltage VOUT of the magnetic-field sensor SM1 as a function of the magnetic-field strength B. Since the magnetic-field sensor SM1 is generally itself a ratiometric sensor (such as a Hall element), the magnetic-field strength B is proportional to the position along the movement axis X. The objective is now to position the full scale range FSR inside the movement range XMIN, XMAX of the magnetic-field source N, S in such a manner that the magnetic-field characteristic curve BCH is as linear as possible or lies on an ideal linear characteristic curve BLIN completely inside the measuring range FSR.

Conventional sensor arrangements of the type presented above perform a compensation of the sensitivity and of air gap variations at power-on and initially travel through the entire movement range XMIN, XMAX. The sensitivity is adjusted or set by the user based on characteristic measurement values. In the ideal case, a mechanical zero position inside the movement range XMIN, XMAX is identical with the magnetic origin B0, so that the ideal linear characteristic curve BLIN results and is optimal in the full scale range FSR. Due to mechanical tolerances, however, the movement range XMIN, XMAX is mostly not optimally centered and the full scale range FSR is not suitably utilized.

Based on these effects, the sensitivity of the sensor is generally reduced in such a manner that as large an area of the characteristic curve BCH as possible lies inside the full scale range. Thereby, however, the gain and thus the possible resolution of the sensor arrangement are reduced. For a movement range XMIN, XMAX of ±250 µm and a mechanical displacement of ±100 µm, for example, a reduction of the resolution of the system by almost a factor of 2 results. The reduction of sensitivity alone also does not guarantee that the corresponding magnetic-field characteristic curve BCH is sufficiently linear inside the full scale range FSR.

SUMMARY OF THE INVENTION

One object of the present invention is to provide a sensor arrangement and a method for operating a sensor arrangement that reduces interfering influences on the sensitivity of the sensor.

In one embodiment, the sensor arrangement comprises at least one magnetic-field sensor. The sensor arrangement further comprises a signal-processing unit and an adjustment circuit. A first combination means couples the first magnetic-field sensor on the input side to the adjustment circuit and connects the magnetic-field sensor on the output side to a signal output of the signal-processing unit.

The signal-processing unit is set up to determine, by means of a comparator or a logic unit for example, a minimum signal and a maximum signal of the first magnetic-field sensor inside the full scale range of the sensor arrangement. Subsequently the adjustment circuit generates a correction signal as a function of the minimum and maximum signals, which is superimposed on sensor signals of the first magnetic-field sensor via the first combination means.

A reduction of factors interfering with the resolution of the sensor arrangement can advantageously be realized with the aid of the adjustment circuit. For example, the first magnetic-field sensor may be arranged with respect to a movable magnetic-field source in such a manner that the full scale range is not optimally utilized. This can be compensated with the adjustment circuit by displacing the full scale range of the sensor with the correction signal. Such a displacement by means of the correction signal additionally has no influence on the linearity of the magnetic-field characteristic.

In another embodiment of a sensor arrangement, the signal-processing unit is connected by means of the signal output to a computation unit. The computation unit is additionally coupled by means of an interface to the adjustment circuit. The computation unit comprises, for example, a microprocessor or a suitable integrated circuit such as an ASIC (ASIC: Application Specific Integrated Circuit).

Based on the sensor signals, the signal-processing unit generates an output signal that is preferably provided at the signal output. Accordingly, the minimum and maximum signal can also be output at the signal output. The computation unit processes the output signals or the minimum and maximum signals according to specification or the intervention of a user. The adjustment circuit generates the correction signal as a result of this processing.

Alternatively, the adjustment circuit can also have appropriate means for creating the correction signal without the computation unit or an external intervention of a user. For this purpose, the adjustment circuit is preferably coupled to the signal output of the signal-processing unit and will generate the correction signal as a function of the maximum and minimum signals.

In another embodiment, the signal-processing unit comprises a signal input and an offset output. A second combination means couples the offset output to the adjustment circuit on the input side. On the output side, the second combination means is connected to the first combination means.

The signal-processing unit is used for additional signal processing of sensor signals from the first magnetic-field sensor. Firstly, for example, it provides sensor signals at the sensor output which are proportional to a position of a magnetic-field source movable along a movement axis. Secondly, the signal-processing unit calculates an offset of the first magnetic-field sensor and provides it at the offset output. Such an offset is superimposed via the second or first combination means on sensor signals of the first magnetic-field sensor. An offset can be compensated in this manner.

The signal-processing unit advantageously permits signal processing and offset compensation. An offset generally occurs in ordinary commercial magnetic-field sensors and is usually a result of fluctuations of the ambient temperature or of production tolerances. A compensation normally leads to a marked increase of the accuracy of a sensor arrangement. For this purpose, the signal-processing unit has suitable means to allow current spinning and corresponding calculations, for example. The signal-processing unit accordingly also allows offset-compensated sensor signals to be tapped at the signal output and brought into connection with a position of a magnetic-field source movable relative to the sensor arrangement.

In an additional embodiment, the adjustment circuit comprises a comparison means that compares the minimum signal with a lower full scale range limit and the maximum signal with an upper full scale range limit. The comparison means is implemented, for example, as a comparator or a suitable logic element.

The full scale range of the sensor arrangement can be characterized with the aid of the lower and upper full scale range limits. For example, a linear full scale range of the sensor arrangement can be defined in this way. A suitable comparison measurement is for example a respective difference between the minimum signal and the lower measurement limit and between the maximum signal and the upper full scale range limit. The comparison using the comparison means preferably takes place when the sensor arrangement is powered on. For this purpose, for example, the movable magnetic-field source can be displaced along the movement axis to a minimum and a maximum position, and the minimum and maximum signals can be measured at the respective positions.

The magnetic-field sensor can preferably be driven by the adjustment circuit in such a manner that the full scale range is advantageously used to a greater extent. In particular, the correction signal can be generated as a function of the comparison.

In another embodiment, the adjustment circuit comprises a switching device coupled between the first magnetic-field sensor and the first combination means.

The switching device is set up to generate a first and second phase signal from sensor signals of the magnetic-field sensor. The first and second phase signals are obtained, for example, by interchanging the electrodes of the magnetic-field sensor. The adjustment circuit then generates the correction signal as a function of the first and second phase signals. So-called current spinning is implemented in this manner.

In the subsequent signal processing in the sensor arrangement, an offset compensation can be performed with the aid of the first and second phase signals. It is known that ordinary commercial magnetic-field sensors such as Hall elements have an offset depending on production tolerances and the ambient temperature. The magnetic-field sensor therefore generates a sensor signal different from zero even when no magnetic field is present. It is advantageous for precise position measurements using a sensor arrangement, however, to correct the offset and thus achieve higher accuracies. A method known as current spinning is used for this purpose. Therein an offset is determined computationally from the first and second phase signals.

In another embodiment, the correction signal is formed temporally synchronously with the first and second phase signals of the first magnetic-field sensor. The adjustment circuit and the switching device are synchronized for this purpose. Based on the phase signals, the magnetic-field characteristic of the magnetic-field sensor can be shifted in such a manner that it optimally fits into the full scale range of the sensor arrangement.

The switching arrangement can advantageously be used in a double manner, first for the offset compensation, but also for the adjustment of the full scale range or the resolution of the sensor arrangement. The synchronous inversion thus leads to a particularly advantageous displacement of the full scale range, which has no influence on the linearity of the magnetic-field characteristic.

In another embodiment, the sensor arrangement comprises at least the first magnetic-field sensor and one second magnetic-field sensor. The sensor arrangement additionally comprises a selection means that is coupled to both the first and the second magnetic-field sensors.

As a function of a magnetic-field source movable relative to the sensor arrangement, for example, corresponding sensor signals are measured with the first or second magnetic-field sensor over the full scale range of the sensor arrangement. The signal-processing unit is set up to determine a minimum signal and a maximum signal of the first or second magnetic-field sensor inside the full scale range of the sensor arrangement This can be done, for example, at given positions of the movable magnetic-field source along a movement axis. The first or second magnetic-field sensor is selected depending on the minimum and maximum signal of the first or second magnetic-field sensor. This is done in that the selection means couples the first or second magnetic-field sensor to the first combination means.

It is advantageously possible by means of the selection means to select one or both magnetic-field sensors, during an initialization when the sensor arrangement is started for a subsequent measurement, for example. The comparison with the minimum signal and the maximum signal also makes it possible to perform the selection with regard to an optimal full scale range. Thus the selection as a function of the minimum and maximum signal can take into account, for example, that the linear component of the magnetic-field characteristic of the first or second magnetic-field sensor is situated as linearly as possible inside the full scale range. In this manner, it is possible to reduce mechanical tolerances and other interfering factors and thus improve the sensitivity or resolution of the sensor arrangement.

In another embodiment, the computation unit is additionally coupled by means of the interface to the selection means.

Based on the sensor signals, the signal-processing unit generates an output signal that is preferably provided at the signal output. Accordingly, the minimum and maximum signals can also be output at the signal output. The computation unit processes the output signals or the minimum and maximum signals according to specification or the intervention of a user. As a consequence of this processing, the selection means selects the first or second magnetic-field sensor by means of a control signal, for example.

Alternatively, the selection means can also have appropriate means for selecting the first or second magnetic-field sensor without the computation unit or an external intervention of a user. For this purpose, the adjustment circuit is preferably coupled to the signal output of the signal-processing unit and makes the selection as a function of the maximum and minimum signals.

In an additional embodiment, the selection means comprises a comparison means that compares the minimum signal with a lower full scale range limit and the maximum signal with the upper full scale range limit. For example, the comparison means comprises a comparator or a suitable logic element.

The full scale range of the sensor arrangement can advantageously be characterized with the aid of the lower and upper full scale range limits. For example, a linear full scale range of the sensor arrangement can be defined in this way. The comparison and thus the selection of the first or second magnetic-field sensor preferably takes place when the sensor arrangement is powered on. For this purpose, for example, the movable magnetic-field source can be displaced along the movement axis to a minimum and a maximum position, and the minimum and maximum signals can be measured at the respective positions. A fast and uncomplicated two-point calibration is possible in this manner.

Alternatively, an entire magnetic-field characteristic curve can be measured and/or stored in a suitable memory. This magnetic-field characteristic curve can then be retrieved for calibration purposes.

In another embodiment, the first combination means comprises a signal amplifier on the input side.

The sensor signal, which is small in certain cases, can be amplified with the signal amplifier or converted into a different electrical parameter. The signal amplifier will preferably convert and amplify a sensor signal into a measurement current.

In another embodiment, the first and the second magnetic-field sensors are connected to a respective switching device.

Each of the switching devices is set up to derive phase signals of the first or second magnetic-field sensor in order to supply them to the signal-processing unit for further signal processing.

In addition, more than two magnetic-field sensors with corresponding respective switching devices can also be provided.

In another embodiment, the signal-processing unit comprises an analog-digital converter that is connected to the signal input. The signal-processing unit further comprises a functional module that is connected to one output of the analog-digital converter. An offset compensation unit is additionally connected to this output of the analog-digital converter. The offset compensation unit is also connected to the offset output. A digital-analog converter couples the offset output to the first combination means.

The signal-processing unit processes the sensor signals of the first or second magnetic-field sensor. For this purpose, the sensor signals are first digitized by means of the analog-digital converter. The functional module is set up to derive an output signal from the sensor signals or the phase signals of the first or second magnetic-field sensor. For example, the position of the movable magnetic-field source can be determined from this output signal. The offset compensation unit is set up to derive an offset signal from the sensor signals or the first and second phase signals of the first or second magnetic-field sensor. This offset signal is converted by the digital-analog converter into an analog offset signal and superimposed on the sensor signals or phase signals by means of the first combination means.

The signal-processing unit advantageously enables an offset compensation by feeding back the sensor signals or the phase signals. The offset signal generated in this way is superimposed on the sensor signals in such a manner that an offset can be taken into account and compensated. The corresponding output signal as provided by the functional module is then free of offset influences.

In one embodiment of the method for operating a sensor arrangement, a minimum signal and a maximum signal of a magnetic-field sensor are determined over a full scale range. A correction signal is additionally generated as a function of the minimum signal and the maximum signal. Sensor signals of the magnetic-field sensor are corrected with a correction signal. A sensor signal corrected in this manner is output by the sensor arrangement.

An improvement of the full scale range and therefore the resolution of the sensor arrangement can advantageously be realized with the aid of the correction signal. For example, the first magnetic-field sensor may be arranged in certain cases in such a manner that the full scale range is not suitably utilized. Thus it can happen that one of the end positions lies outside the full scale range at the peripheral areas. This can be compensated with the correction signal by shifting the full scale range of the magnetic-field sensor.

According to an additional embodiment, the correction signal is generated as a function of the comparison of the minimum signal with a lower full scale range limit and the maximum signal with an upper full scale range limit.

A linear full scale range of the sensor arrangement is characterized with the aid of the lower and upper full scale range limits. It is therefore advantageous to also relate the correction signal to these comparative parameters. In that way, the full scale range of the sensor arrangement can be adjusted so that it is as linear as possible, and sensor signals remain inside the full scale range.

In another embodiment, the correction signal is generated as a function of a first and a second phase signal of the first magnetic-field sensor. The first and second phase signals result, for example, from current spinning of the sensor signals from the magnetic-field sensor by means of a suitable switching device.

The phase signals can advantageously be used in a double manner for offset correction and for the correction signal. Based on the phase signals, the magnetic-field characteristic of the magnetic-field sensor can be shifted so that it optimally fits into the full scale range of the first magnetic-field sensor.

In another embodiment, the correction signal is generated as a function of the first and second phase signals by means of a synchronous inversion.

The phase signals result from interchanging the electrodes of the magnetic-field sensor and are thus of different polarities. Their magnitude is the same, however. The correction signal is thus inverted synchronously with the phase signals.

In another embodiment of a sensor arrangement, the minimum and maximum signals of the first and a second magnetic-field sensor are determined inside the full scale range. The minimum signal and the maximum signal are compared with previously determined comparison values. The first or second magnetic-field sensor is selected depending on the comparison of the minimum signal and the maximum signal with the determined comparison values.

It is advantageously possible by means of the comparison of the minimum signal and the maximum signal to carry out a selection of the magnetic-field sensor with regard to an optimal full scale range. Thus the selection as a function of the minimum and maximum signal can take into account that the sensor signals of the first or second magnetic-field sensor are as linear as possible to the position of the magnetic-field source inside the full scale range. In this manner, it is possible to reduce mechanical tolerances and other interfering factors and thus improve the sensitivity or resolution of the sensor arrangement. The method is preferably executed when the sensor arrangement is initialized.

In another embodiment, the determined comparison values each comprise a lower full scale range limit and an upper full scale range limit.

The full scale range of the sensor arrangement can advantageously be characterized with the aid of the lower and upper full scale range limits. For example, a linear full scale range of the sensor arrangement can be defined in this way. For this purpose, a movable magnetic-field source can travel along the movement axis to a minimum and a maximum position, for example, and the minimum and maximum signals can be measured at the respective positions. This enables a fast and uncomplicated calibration of a full scale range that is as linear as possible.

BRIEF DESCRIPTION OF THE DRAWINGS

The invention will be described in detail below for several exemplary embodiments with reference to the figures. Elements with identical function or effect bear identical reference numbers. Insofar as components correspond to one another in function, a description of them will not be repeated in each of the following figures.

FIG. 2 shows an exemplary embodiment of a sensor arrangement according to the invention, FIGS. 4A, 4B, 4C, 4D show an exemplary mode of operation of an adjustment circuit for a sensor arrangement according to the invention, FIGS. 5A, 5B, 5C show an exemplary mode of operation for a selection circuit for a sensor arrangement according to the invention.

DETAILED DESCRIPTION OF THE DRAWINGS

Figure 1A:
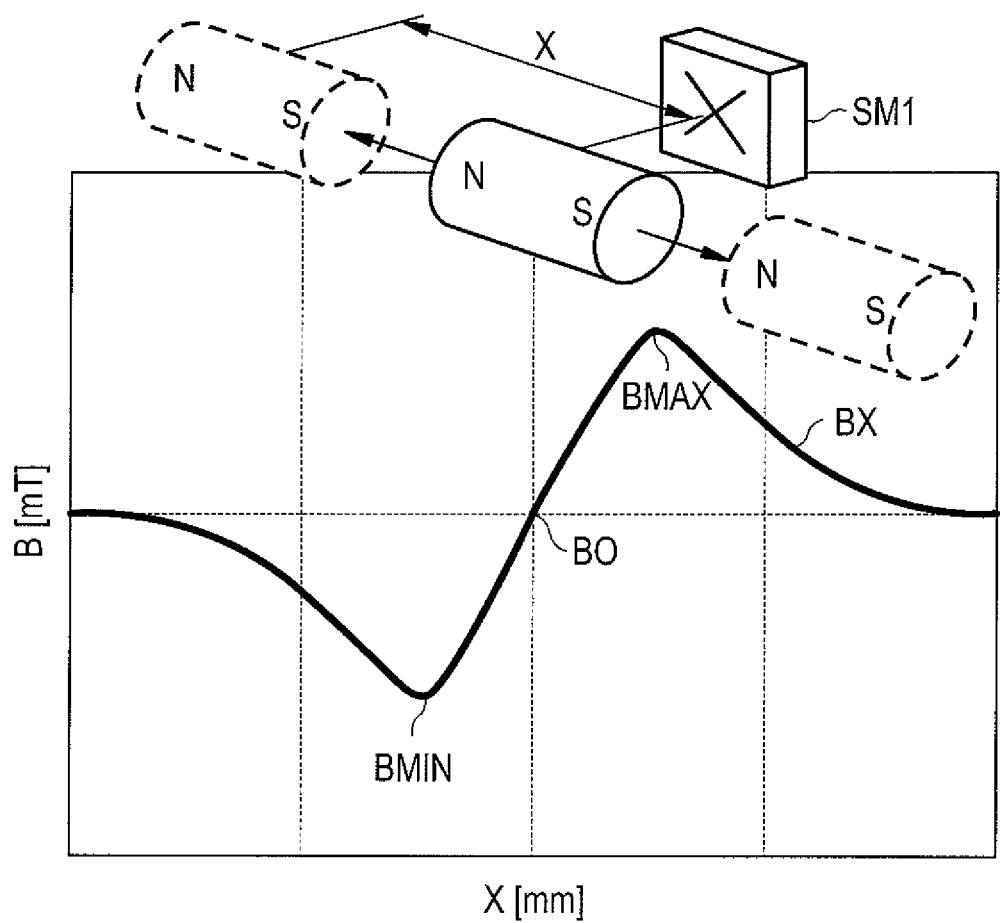
FIG. 1A shows a sensor arrangement with a magnetic-field sensor and a movable magnetic-field source, as well as a characteristic curve of the measured magnetic-field strength.
Figure 1B:
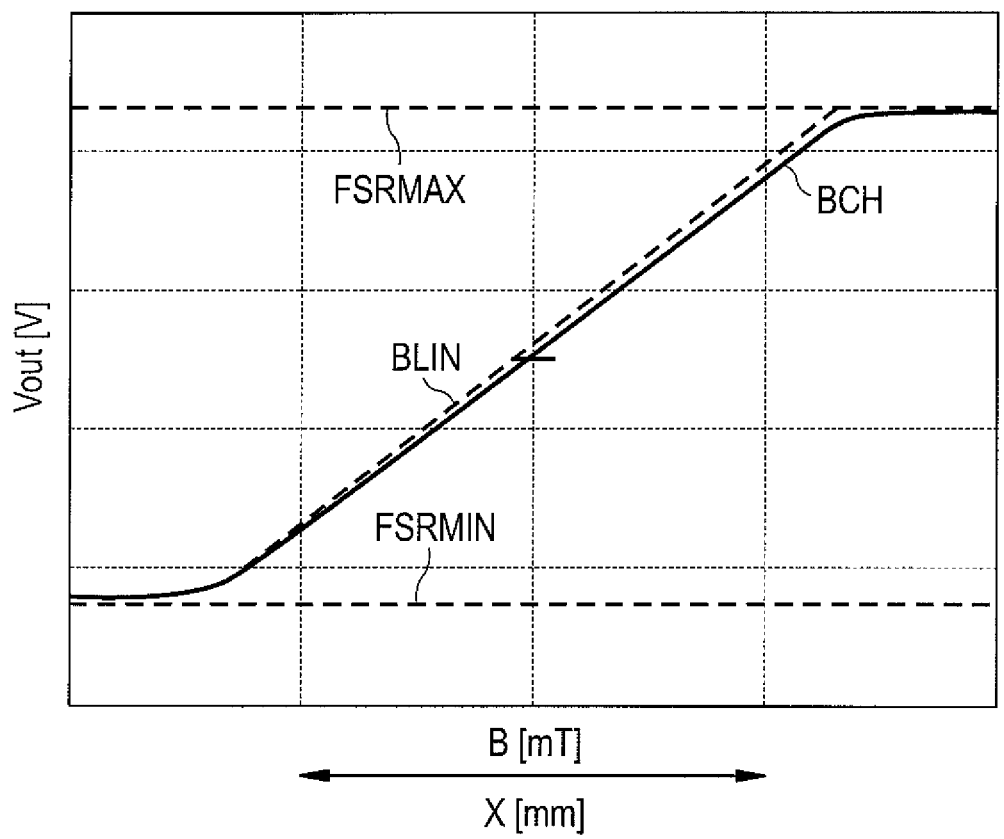
FIG. 1B shows a magnetic-field characteristic curve as a function of the magnetic-field strength for a full scale range.

FIG. 2 shows a sensor arrangement according to the invention. The sensor arrangement comprises a first magnetic-field sensor SM1, preferably a Hall element. The first magnetic-field sensor SM1 is coupled via a first switching device SW1 to a first signal amplifier A. This signal amplifier A is connected to a first combination means ADD1. On the output side, the combination means ADD1 is connected to an analog-digital converter ADC included in signal processing unit PROC. Signal processing unit PROC also includes functional module POS, offset compensation unit OFF, and integrator INT. The analog-digital converter ADC is connected via an output to the functional module POS and offset compensation unit OFF. The offset compensation unit OFF is connected via integrator INT, a second combination means ADD2 and a digital-analog converter DAC to the first combination means ADD1.

The first magnetic-field sensor SM1 generates a first sensor signal S1, which is dependent, for example, on the position of a magnetic-field source N, S movable relative to the sensor arrangement along a movement axis X. A maximum signal and a minimum signal are determined by means of the signal-processing unit PROC, preferably during an initialization routine when the sensor arrangement is started. For this purpose, for example, the magnetic-field source N, S movable relative to the sensor arrangement is moved over its range of motion between two end positions XMIN, XMAX. Sensor signals are recorded at the respective end positions of the movement XMIN, XMAX and thus form the minimum signal MIN and the maximum signal MAX. Depending on the minimum signal MIN and the maximum signal MAX, there is additional signal processing and optimized operation of the magnetic-field sensor SM1. This is discussed further with reference to FIGS. 4A-4D and 5A-5C. The signal processing described there preferably takes place after the gain of the sensor arrangement has been adjusted, and remains constant in the subsequent steps.

The sensor signal S1 is generally affected by an offset. This offset appears even without an external magnetic field, due to temperature and process variations in the employed magnetic-field sensor SM1 itself. Such an offset is known for Hall elements, for example, and is the subject matter of numerous methods and measures for compensation. Thus a technique known as "current spinning" is known for compensating the offset of Hall elements.

Current spinning is implemented with the aid of the switching device SW1. The switching device SW1 comprises all necessary components for changing the direction of a Hall current through the magnetic-field sensor SM1. This is accomplished by alternating changeover of electrodes of the magnetic-field sensor SM1 and generates two phase signals VPH1, VPH2, for example. The latter correspond to two sensor signals S1 of different polarity. An offset can be removed computationally on this basis.

The two phase signals VPH1, VPH2 are supplied via the signal amplifier A and the first combination means ADD1 to the analog-digital converter ADC and converted there into digital signals. An offset for the magnetic-field sensor SM1 is then calculated in the offset compensation unit OFF from the two now-digital phase signals VPH1, VPH2. It is calculated, for example, by summing the two phase signals. VPH1, VPH2:

$$OFF = VPH1 + VPH2.$$

The offset is converted via the integrator INT into an analog signal by means of the digital-analog converter DAC, and supplied via the first combination means ADD1 to the two amplified phase signals VPH1, VPH2 of the magnetic-field sensor SM1 in such a manner that the offset is compensated.

The sensor signals S1 digitized by the analog-digital converter ADC, or the two phase signals VPH1, VPH2, are also supplied to a functional module POS to determine a position of the movable magnetic-field source N, S. A position value is derived by suitable signal processing. To this end, for example, the two phase signals VPH1, VPH2 are subtracted:

$$VOUT = VPH1 - VPH2 \propto X.$$

The thus-derived difference signal or output signal VOUT from the two phase signals VPH1, VPH2 is proportional to a position X of the magnetic-field source N, S.

The signal-processing unit PROC is additionally set up to determine a minimum signal MIN and a maximum signal MAX of the magnetic-field sensor SM1 over the full scale range FSR. The adjustment circuit DSPL then generates a correction signal COR as a function of the minimum and maximum signals MIN, MAX. The mode of operation of the adjustment circuit DSPL will be described further with reference to FIGS. 4A-4D.

Figure 3:
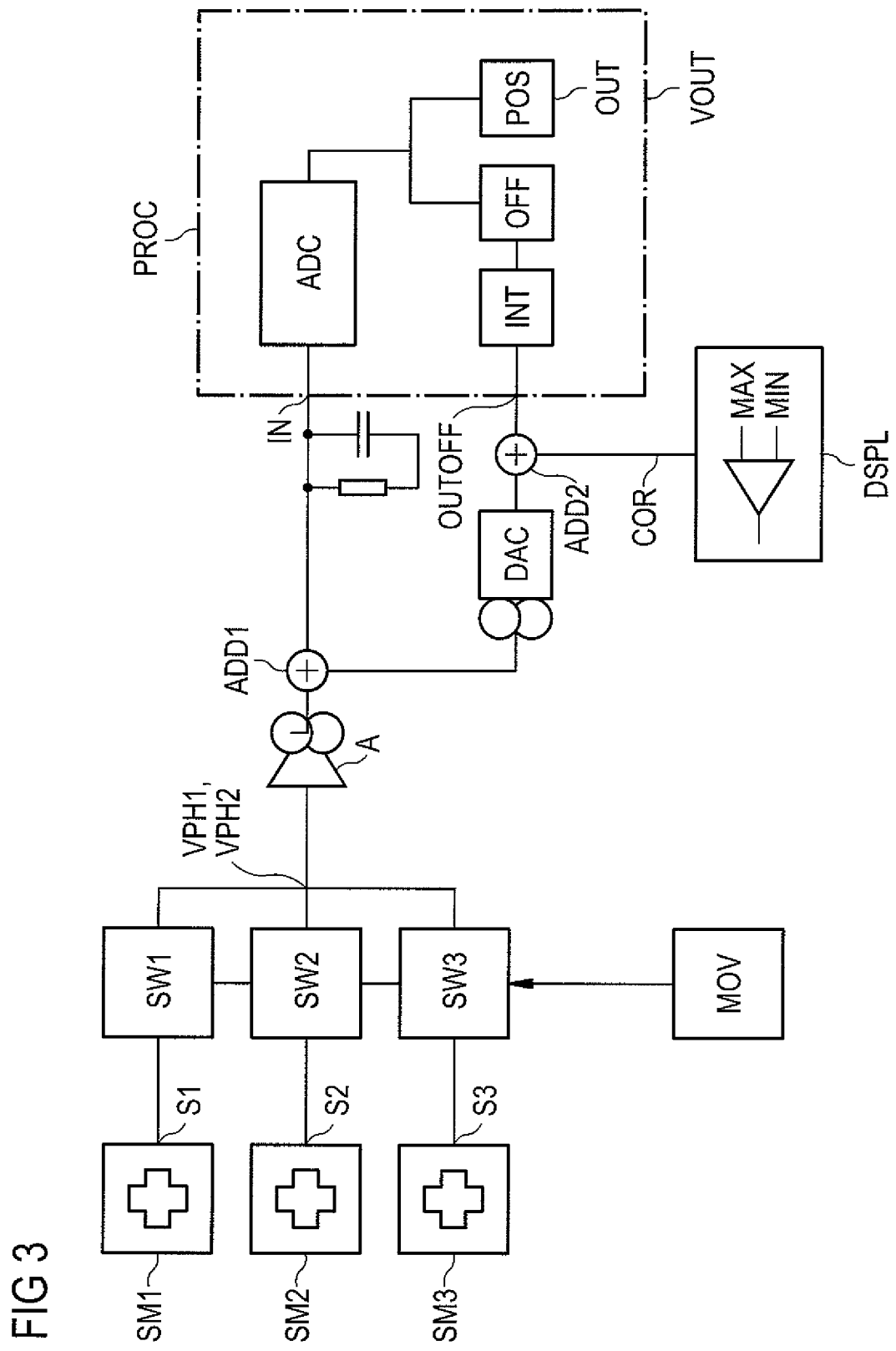
FIG. 3 shows another exemplary embodiment of a sensor arrangement according to the invention.

FIG. 3 shows another exemplary embodiment of a sensor arrangement according to the invention. FIG. 3 shows the sensor arrangement according to FIG. 2, additionally comprising a sensor array consisting of a first, second and third magnetic-field sensor SM1, SM2, SM3. Each of the magnetic-field sensors SM1, SM2, SM3 is connected to a respective first, second and third switching device SW1, SW2, SW3. On the output side, the first, second and third switching devices SW1, SW2, SW3 are connected to the signal amplifier A. A selection means MOV is also coupled to the first, second and third switching devices SW1, SW2, SW3.

The first, second and third magnetic-field sensors SM1, SM2, SM3 generate a respective sensor signal S1, S2, S3, dependent, for example, on the position of a magnetic-field source N, S relative to the sensor arrangement along a movement axis X. These sensor signals S1, S2, S3 are supplied to the corresponding switching devices SW1, SW2, SW3. A current spinning as discussed with reference to FIG. 2 is implemented in the switching devices SW1, SW2, SW3. Thus a respective set of two phase signals VPH1, VPH2 is generated for the first, second and third magnetic-field sensor SM1, SM2, SM3. Which of the two phase signals VPH1, VPH2 is supplied to the signal amplifier A is determined by means of the selection circuit MOV. The exact mode of operation of the selection circuit MOV will be discussed further with reference to FIGS. 5A-C.

The selection means MOV controls the switching devices SW1, SW2, SW3, preferably as a function of the minimum and maximum signals MIN, MAX and thus selects one of the magnetic-field sensors SM1, SM2, SM3. In this manner, the switching devices SW1, SW2, SW3 can be used doubly, both for current spinning and for the subsequent signal processing.

Alternatively, a number of magnetic-field sensors different from three can be provided. For example, a sensor array of magnetic-field sensors arranged along a line or in a matrix is possible. It is also conceivable to provide only two magnetic-field sensors.

The spacings of the magnetic-field sensors can advantageously be selected for a given application in such a manner that they allow a further improvement of the resolution for the sensor arrangement.

FIGS. 4A-4D illustrate the mode of operation of the adjustment circuit DSPL of a sensor arrangement according to the proposed principle.

FIG. 4A shows an output signal VOUT of the first magnetic-field sensor SM1 plotted against the position of the magnetic-field source N, S along the movement axis X. The output signal VOUT of the magnetic-field sensor SM1 yields a magnetic-field characteristic curve BCH. The objective of the sensor arrangement and the adjustment circuit DSPL is to remain inside the full scale range limits FSRMIN, FSRMAX between the end positions XMIN, XMAX of the magnetic-field source N, S. This magnetic-field characteristic curve BCH ideally fills out the entire full scale range FSR of the sensor arrangement. Thereby a high gain inside the movement range XMIN, XMAX, or the full scale range FSR is possible and leads to a high resolution of the sensor arrangement.

The described ideal case does not appear in FIG. 4A, however. A first measurement point 1 on the magnetic-field characteristic curve BCH characterizes the minimum signal MIN, i.e., the output signal VOUT of the magnetic-field sensor SM1 at the position XMIN of the magnetic-field source N, S. A second measurement point 2 on the magnetic-field characteristic curve BCH characterizes the maximum signal MAX, i.e., the output signal VOUT of the magnetic-field sensor SM1 at the position XMAX. As is clearly visible in FIG. 4A, the first measurement point 1 lies outside the full scale range FSR. The second measurement point 2 does lie inside the full scale range FSR, but the magnetic-field characteristic curve BCH does not fill the range out optimally, i.e., there is a distance between the maximum signal MAX and an upper full scale range limit FSRMAX. Ideally, the first measurement point 1 should have the values XMIN, FSRMIN, and the second measurement point should have the values XMAX, FSRMAX. FSRMIN designates a lower full scale range limit.

FIG. 4B shows the output voltage VOUT of the first magnetic-field sensor SM1 at the end positions XMIN, XMAX plotted versus the time t. The figure shows the ideal linear magnetic-field characteristic curve BLIN and the measured or actual magnetic-field characteristic curve BCH. This magnetic-field characteristic curve BCH is inverted as a result of current spinning corresponding to a first and second phase and is drawn in as an inverted magnetic-field characteristic line BCH'. The corresponding phase signals VPH1, VPH2, or the magnetic-field characteristic curve BCH and the inverted magnetic-field characteristic curve BCH', can be compared with means such as comparators with the lower and upper full scale range limits FSRMIN, FSRMAX.

FIG. 4C shows a correction signal COR plotted versus the time t. Based on the magnetic-field characteristic curve BCH and the inverted magnetic-field characteristic curve BCH', or the phase signals VPH1, VPH2, a correction signal COR can be determined in the movement range XMIN, XMAX by comparison with the lower and upper full scale range limit FSRMIN, FSRMAX. It can be applied in the entire range of movement XMIN, XMAX, i.e., to the entire magnetic-field characteristic curve BCH. This is done by addition, for example. The correction signal COR is inverted temporally synchronously with the first and second phase or the phase signals VPH1, VPH2 of the current spinning. The sign of the correction signal COR can also be changed by reversing the phase relationship of the first and second phase.

FIG. 4D shows the output signal of the magnetic-field sensor SM1 measured downstream of the first combination means ADD1 and plotted versus the time t. The correction signal COR generates a corrected characteristic curve by addition to the phase signals VPH1, VPH2, for example. This has the result that both the magnetic-field characteristic curve BCH and the inverted magnetic-field characteristic curve BCH', or the corresponding two phase signals VPH1, VPH2 are displaced along the axis of the output signal VOUT.

It is advantageously possible to shift the magnetic-field characteristic curve BCH in small steps with the aid of the adjustment circuit DSPL. By comparison with the lower and upper full scale range limits FSRMIN, FSRMAX, the shift can be carried out in such a manner that the magnetic-field characteristic curve BCH optimally covers the full scale range FSR. That allows an improved gain and thus resolution of the sensor arrangement. Moreover, the linearity of the magnetic-field characteristic curve BCH is not influenced.

The sensor arrangement can also be operated with more than one magnetic-field sensor, as described in FIG. 3. In this regard, FIG. 5A shows the output voltage VOUT of a magnetic-field sensor SM1, SM2, SM3 from a sensor arrangement with a first, second and third magnetic-field sensor SM1, SM2, SM3 plotted against the position along the movement axis X of the movable magnetic-field source N, S. In the present case, the second magnetic-field sensor SM2 has been selected by means of the selection circuit MOV and the magnetic-field characteristic curve BCH indicates its magnetic-field characteristic curve BCH.

In this case, the magnetic-field characteristic curve BCH lies ideally between the positions XMIN, XMAX and coincides with an ideal linear magnetic-field characteristic curve. The measurement points 1, 2 also lie on the upper and lower full scale range limits FSRMIN, FSRMAX. In this optimum case, the highest resolution of the sensor arrangement, or the highest gain, is possible.

This is not always the case, however, due to production tolerances and as a result of mechanical influences. The objective of the selection circuit is therefore to position an optimally large linear range of the magnetic-field characteristic curve BCH in the full scale range FSR inside the range of motion XMIN, XMAX. In other words, the first measurement point 1 should have the values XMIN, FSRMIN and the second measurement points 2 should have the values XMAX, FSRMAX.

FIG. 5B shows a case in which the magnetic-field characteristic curve BCH between the positions XMIN, XMAX is not linear and does not ideally cover the full scale range FSR. This is particularly clear at the first and second measurement points 1, 2. At the first measurement point 1, the magnetic-field characteristic curve BCH does not lie on the ideal linear magnetic-field characteristic curve BLIN and likewise deviates from the lower full scale range limit FSRMIN. At the second measurement point 2, the magnetic-field characteristic curve BCH is parallel to the ideal linear magnetic-field characteristic curve BLIN, but is at an output voltage VOUT that lies below the upper full scale range limit FSRMAX.

In order to achieve a higher gain or higher resolution of the sensor arrangement, a different magnetic-field sensor among the magnetic-field sensors SM1, SM2, SM3 is selected by the selection circuit MOV, for example the first magnetic-field sensor SM1. As can be seen in FIG. 5C, the first magnetic-field sensor SM1 is more suitable, for example, i.e., its magnetic-field characteristic curve BCH has a greater degree of linearity between the end positions XMIN, XMAX. In other words the selection means MOV selects a magnetic-field sensor SM1, SM2, SM3 that has an optimal linear range of the magnetic-field characteristic curve BCH. This can be done, for example, during the initialization of the sensor arrangement.

With the combination of the adjustment circuit DSPL and the selection circuit MOV, a further improvement of the gain, and thus the resolution of the sensor arrangement, can advantageously be achieved. For example, a magnetic-field sensor SM1, SM2, SM3 that can achieve the highest resolution can be selected by the selection means MOV. Since the magnetic-field sensors always have a distance from one another, however, the magnetic-field characteristic curve BCH of the selected magnetic-field sensor may not completely fill out the full scale range FSR. The adjustment circuit DSPL then undertakes an additional and finer optimization by displacing the magnetic-field characteristic curve BCH.

An inverse procedure is also conceivable, in which the adjustment circuit DSPL undertakes a displacement of the magnetic-field characteristic curve BCH. If that encounters certain system-related limits, then the selection circuit MOV could select a different magnetic-field sensor and the adjustment circuit DSPL could again undertake its adjustment.

Figure 6:
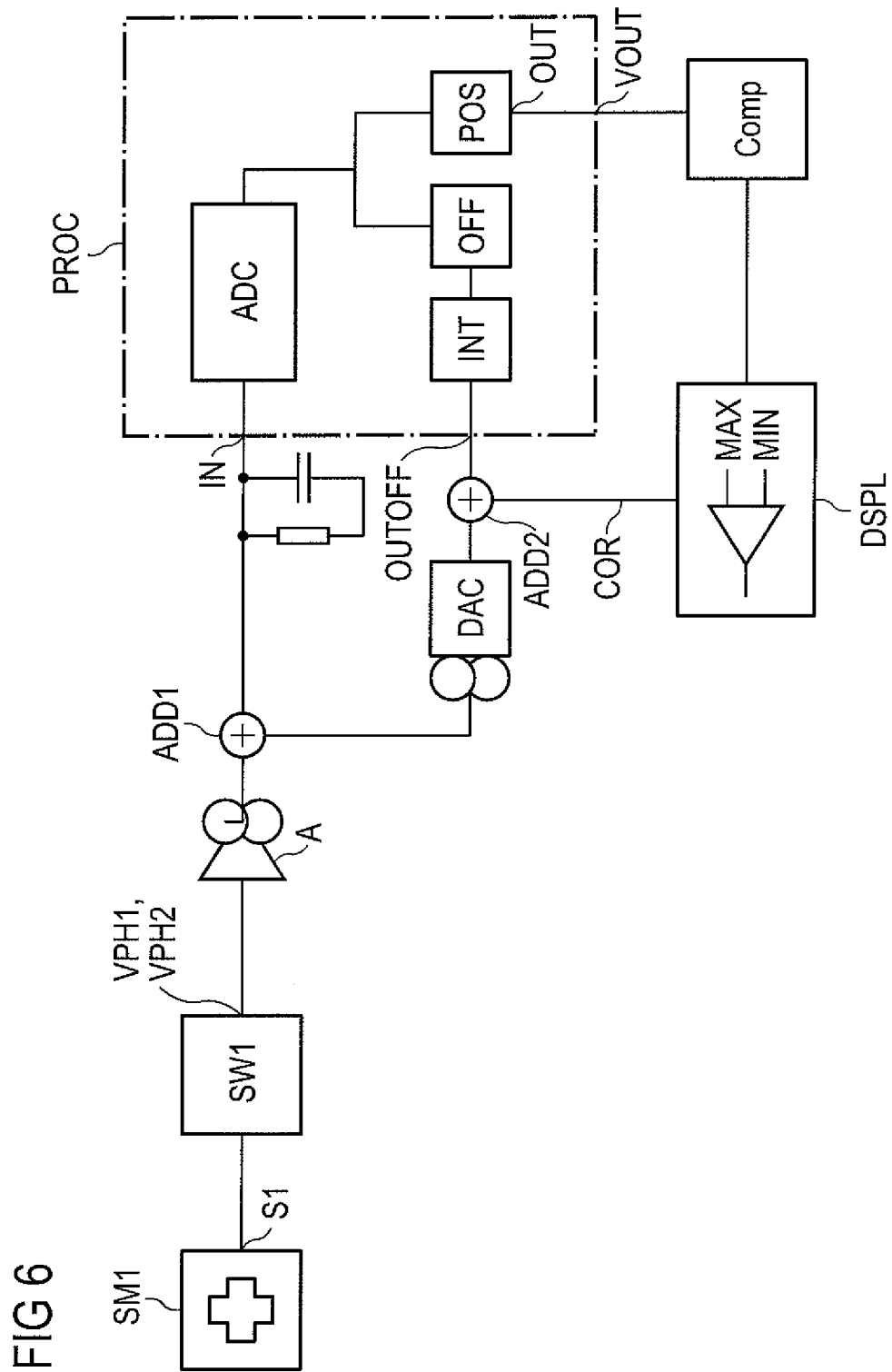
FIG. 6 shows an exemplary embodiment of a sensor arrangement according to FIG. 2, with a computation unit according to the invention.

FIG. 6 shows another exemplary embodiment of a sensor arrangement according to FIG. 2, with a computation unit COMP according to the proposed principle. In addition to the components shown in FIG. 2, the sensor arrangement comprises a computation unit COMP that is connected to the signal-processing unit PROC by means of a signal output OUT. The computation unit COMP is additionally coupled by means of an interface to the adjustment circuit DSPL. The computation unit COMP comprises, for example, a microprocessor or a suitable integrated circuit such as an ASIC (ASIC: Application Specific Integrated Circuit).

Based on the sensor signals, the signal-processing unit PROC generates the output signal VOUT, which is preferably provided at the signal output OUT. Accordingly, the minimum and maximum signals MIN, MAX can also be output at the signal output OUT. The computation unit COMP processes the output signals VOUT or the minimum and maximum signals MIN, MAX according to specification or the intervention of a user. The adjustment circuit DSPL generates the correction signal COR as a result of this processing.

In another alternative exemplary embodiment, not-shown, the adjustment circuit DSPL can have appropriate means for creating the correction signal COR without the computation unit or an external intervention of a user. For this purpose, the adjustment circuit DSPL is preferably coupled to the signal output OUT of the signal-processing unit PROC and will make the selection as a function of the minimum and maximum signals MIN, MAX.

In another exemplary embodiment that is not shown, a sensor arrangement according to FIG. 3 further comprises the computation unit COMP. The latter is accordingly connected to the signal-processing unit PROC by means of the signal output OUT. The computation unit COMP is also coupled by means of an additional interface to the selection means MOV.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

We claim:

1. A linear position detector, comprising:
   at least one magnetic-field sensor that generates sensor signals;
   a signal-processing unit configured to determine, during an initialization routine of the linear position detector, a minimum signal and a maximum signal of the at least one magnetic-field sensor over a linear full scale range of the linear position detector as a function of a magnetic-field source movable linearly along a movement axis relative to the linear position detector; and
   wherein the signal-processing unit has a signal input and an offset output, the offset output providing an offset signal,
   the at least one magnetic-field sensor is connected to a first switching device that is configured to generate a first phase signal and second phase signal from the sensor signals of the at least one magnetic-field sensor,
   the first and second phase signals are associated with a change in a direction of a Hall current through the at least one magnetic-field sensor,
   an adjustment circuit that is set up to generate a correction signal as a function of the minimum and maximum signals or first and second phase signals,
   the correction signal is inverted synchronously with the first and second phase signals,
   the signal-processing unit is configured to derive the offset signal from the sensor signals or first and second phase signals of the at least one magnetic-field sensor,
   a first combination means effectively couples, on an input side, the at least one magnetic-field sensor to the offset output and connects, on an output side, to the signal input, and
   a second combination means is connected to the offset output and the adjustment circuit on an input side of the second combination means, and is coupled on an output side to the first combination means such that the correction signal and the offset signal are superimposed on the sensor signals or first and second phase signals of the at least one magnetic-field sensor.

2. The linear position detector according to claim 1, wherein the signal-processing unit is connected by means of a signal output to a computation unit, and wherein the computation unit is coupled by means of an interface to the adjustment circuit.

3. The linear position detector according to claim 1, wherein the adjustment circuit comprises a comparison means that compares the minimum signal with a lower linear full scale range limit, and the maximum signal with an upper linear full scale range limit.

4. The linear position detector according to claim 1, wherein the at least one magnetic-field sensor comprises:
   a sensor array including a first magnetic-field sensor and a second magnetic-field sensor, and
   a selection means, by means of which the first or second magnetic-field sensor can be selected as a function of the minimum and maximum signal.

5. A method for operating a linear position detector, the method comprising:
   determining, during an initialization routine of the linear position detector, a minimum signal and a maximum signal of a magnetic-field sensor generating sensor signals over a linear full scale range of the linear position detector as a function of a magnetic-field source movable linearly along a movement axis relative to the linear position detector;
   changing a direction of a Hall current through the magnetic-field sensor to generate a first phase signal and a second phase signal from the sensor signals of the magnetic-field sensor;
   deriving an offset signal from the sensor signals or first and second phase signals of the magnetic-field sensor;
   generating a correction signal as a function of the minimum signal and the maximum signal or the first and second phase signals; and
   correcting the sensor signals or first and second phase signals of the magnetic-field sensor with a combination of the correction signal and the offset signal such that the correction signal and the offset signal are superimposed on the sensor signals or first and second phase signals of the magnetic-field sensor,
   wherein the correction signal is inverted synchronously with the first phase signal and second phase signal of the magnetic-field sensor.

6. The method according to claim 5, wherein:
   the minimum signal is compared with a lower linear full scale range limit, and the maximum signal is compared with an upper linear full scale range limit, and
   the correction signal is generated as a function of the comparison of the minimum signal with the lower linear full scale range limit and the maximum signal with the linear upper full scale range limit.

* * * * *